Oct. 20, 1953      W. C. EDDY      2,656,184
ENDLESS FILM MAGAZINE
Filed Jan. 26, 1950      2 Sheets-Sheet 1
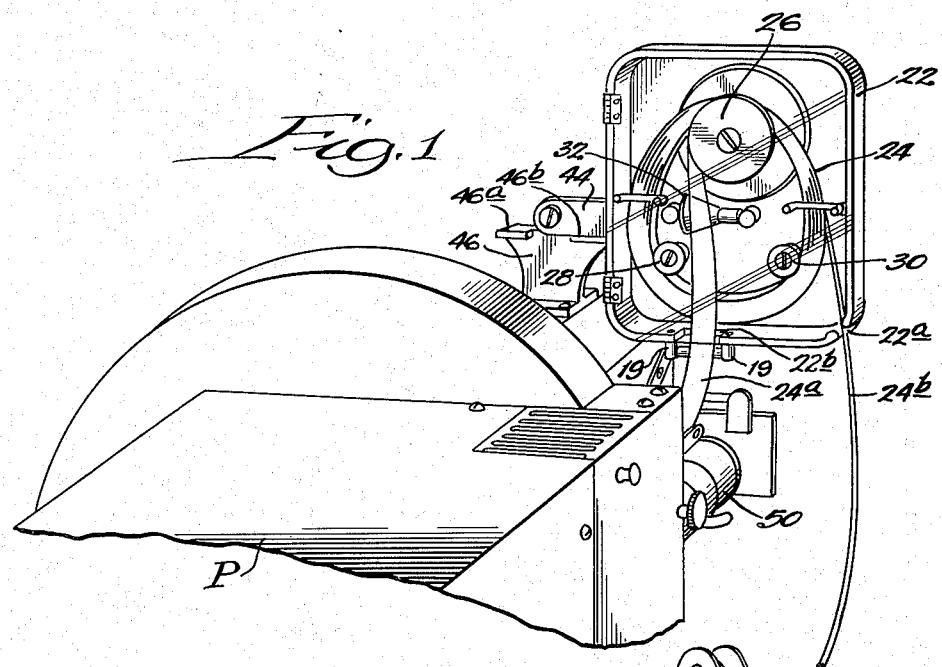
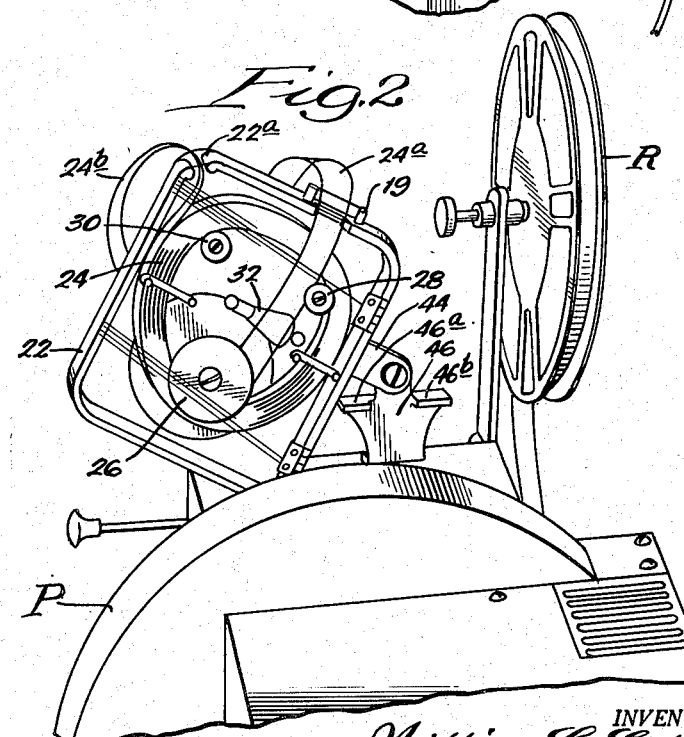
INVENTOR:
William C. Eddy,
BY Dawson, Ooms, Broth and Spangenberg,
ATTORNEYS.

Oct. 20, 1953   W. C. EDDY   2,656,184
ENDLESS FILM MAGAZINE
Filed Jan. 26, 1950   2 Sheets-Sheet 2
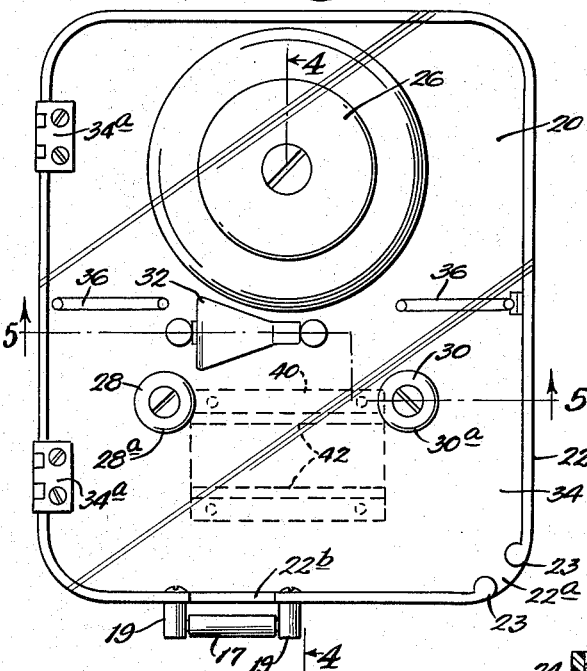
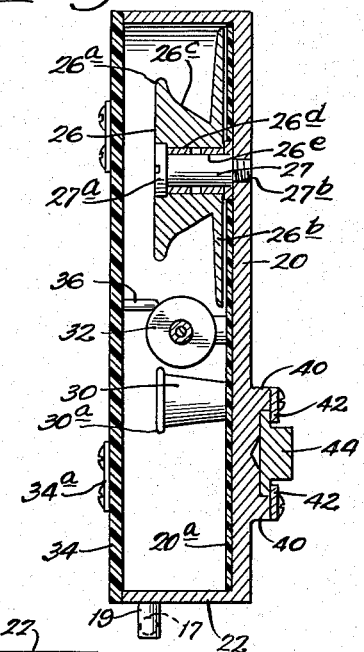
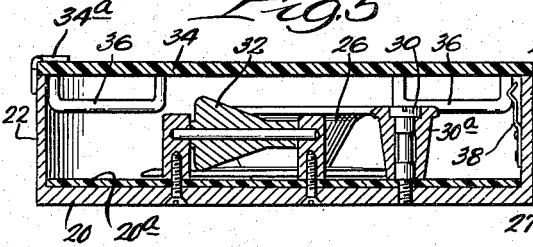
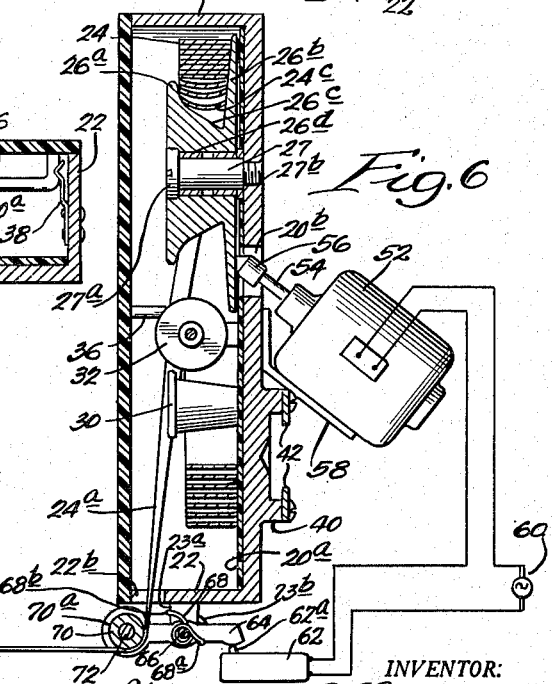
INVENTOR:
William C. Eddy,
BY Dawson, Orms, Booth and Spangenberg,
ATTORNEYS.

Patented Oct. 20, 1953

2,656,184

UNITED STATES PATENT OFFICE 2,656,184

ENDLESS FILM MAGAZINE

William C. Eddy, Michigan City, Ind., assignor to Television Associates, Inc., Michigan City, Ind., a corporation of Illinois Application January 26, 1950, Serial No. 140,708

1 Claim. (Cl. 271—2.18)

My invention relates to an improved mechanism to retain an endless film such as a motion picture film for storage and use.

In one method of arranging a lengthy film for purposes of storage or use, the film is wound to form an endless coil. A magazine is provided to encase this coil and includes suitable mechanism to retain the same while film is unwound from the inner periphery thereof and wound up on the outer periphery. The latter action is produced by the rotation imparted to the coil as a unit by the unwinding action of the inner periphery.

It is highly desirable in the foregoing type of film winding device to maintain the coil in a taut condition at all points to minimize the space required thereby and to facilitate handling thereof. However, it is equally desirable to avoid an undue degree of tension or any other factor that increases the drag on the unwinding inner periphery of the film beyond the ability of the film using device to withdraw the film or the ability of the film itself to withstand the tension.

In accordance with the present invention, bodily rotations are effectively applied to the film coil by gripping mechanism operative to grip the inner periphery of the film coil while leaving the outer turns subject only to a limited frictional drive. This provides a positive and effective coil tightening mechanism without undue drag.

Further in accordance with the present invention, coil driving means are provided to rotate the coil in the unwinding direction in response to the tension on the unwinding portion of the film. When the film tension exceeds a predetermined value, the coil driving elements are energized to supplement the pull on the film itself in rotating the film coil, thereby releasing the load on the film using device and the film itself.

It is therefore a general object of the present invention to provide an improved endless film mechanism capable of maintaining the film coil in a taut condition.

Further it is an object of the present invention to provide an improved endless film mechanism having gripping elements operative to effectively engage the inner turns of the film coil while leaving the outer turns of the coil in a relatively free condition.

Another object of the present invention is to provide an improved endless film mechanism having tension relieving elements capable of relieving the tension on the unwinding film.

Further it is an object of the present invention to provide an improved endless film mechanism having means responsive to the tension of the unwinding film to rotate the film coil bodily.

A further object of the present invention is to provide an improved film magazine for endless film having a releasible cover adapted to retain the film in the slots where it enters and leaves the magazine.

Still another object of the present invention is to provide an improved magazine for an endless film that may be removably attached to a motion picture projector.

Yet another object of the present invention is to provide an improved mechanism to hold a film magazine in a retracted position on a motion picture projector and capable of quickly positioning the magazine for operation.

The novel features which I believe to be characteristic of my invention are set forth with particularity in the appended claim. My invention itself, however, both as to its organization and method of operation may best be understood by reference to the following description taken in connection with the accompanying drawings, in which:

Figure 1 is a view in perspective of a projector upon which is mounted a film magazine constructed in accordance with the principles of the present invention;

Figure 2 is a perspective view of the apparatus of Figure 1 with the film magazine in the retracted position;

Figure 3 is a top plan view of the film magazine of the present invention;

Figures 4 and 5 are cross-sectional views through the axis 4—4 and 5—5, Figure 3, respectively; and Figure 6 is a view in cross-section like Figure 4 but showing tension relieving elements constructed in accordance with the principles of the present invention.

Referring now to the figures, there is shown at 20 a back plate of square configuration with the corners rounded. An edge 22 surrounds this plate and is formed integral therewith to define a receptacle to receive the film coil 24, Figure 1.

If desired, a sheet of plastic material 20a may be placed over the bottom 20 as shown in Figure 5.

The roller 26 is mounted on back plate 20 with its axis parallel to the axis of the film coil 24. As seen best in Figure 3, this roller is eccentrically positioned relative to the back plate 20. A pair of guide posts 28 and 30 are mounted on back plate 20 to receive the inner periphery of film coil 24 in the region opposite roller 26, thereby retaining that coil in fixed position relative to the magazine structure. These posts have roller sleeves 28a and 30a, Figures 3 and 5, to reduce the frictional drag to rotations of the film coil.

A conical roller 32 having its axis directed transversely to the axis of coil 24 and roller 26 forms a guide to receive the leaving or unwinding portion 24a from the center of the film coil 24 to lift this portion of the film over the film coil proper and the edge 22.

The edge or skirt 22 has a slot 22a oriented in direction substantially parallel to the axis of coil 24 as shown best in Figure 3. This slot receives the incoming or entering portion 24b of the film to wind on the outer periphery of the film coil 24. Rounded posts 23 are located at the sides of the slot 22a to guide the film past the slot without danger of undue bending or breakage and to minimize the frictional drag associated with film movement. A notch or cut away portion 22b is cut out of the edge 22 to receive the leaving portion 24a of the film. A pair of posts 19 extend outwardly from the edge 22 and receive the roller 17 as shown in Figure 3. This roller forms a low friction support for the film as it leaves the magazine.

The roller 26 has an intermediate conical portion 26c with opposed top and bottom flanges 26a and 26b, respectively. A bore 26d through the center of the roller receives the sleeve 26e. The latter receives the screw-pin 27 having a head portion 27a that overlies the roller 26 to secure it in position. The threaded end portion 27b of the post 27 is received in the back plate 20.

The lower flange 26b of the roller 26 defines a sloping surface on the side opposite the back plate 20. The upper flange 26a is formed with a similar taper to define a slot-like space of progressively reduced dimension as the axis of the roller is approached.

Figure 6 shows the film coil 24 in the condition assumed when the film is being withdrawn from the unit. As shown in this figure, the inner turn of the coil, indicated at 24c, bows to accommodate itself to the reduced slot dimension of the roller 26 in its inner portions. This turn of the coil is forced to the bowed condition by the tension on the unwinding portion 24a of the film, this tension being developed by the film take-up mechanism on the motion picture projector or other device using the film.

The bowed condition of the inner turn of the film between the flanges 26a and 26b provides an effective frictional grip between the film and the roller 26. This causes the roller 26 to rotate at an angular velocity corresponding to the linear velocity at which the film is withdrawn and the radius arm between the inner turn of the film and the axis of the roller. Since the outer turns of the film are in frictional contact with the flange 26b of the roller 26 and with each other, this rotation of the roller tightens the film and causes it to assume a snug compact condition.

Since the bowed inner turns of the film have a relatively tight frictional grip on the flanges 26a and 26b, there is little slippage at this point and the slip is substantially confined to the outer turns.

A transparent cover 34 is supported from the skirt 22 by the hinges 34a. This cover carries a pair of U-shaped depending guide arms 36 which bear against the upper edge of the film coil to hold it against the bottom of the magazine. A snap arm 38 affixed to the skirt 22 engages one of the arms 36 to releasably retain the cover closed. The arms 36 are held to the cover by the snug fit between each arm and the openings in cover 34 provided for the same.

The cover 34 acts as a releasable guide to hold the film in slots 22b and 22a. Since it overlays each of these slots, it closes them and overcomes any tendency of the film to move outside the slots.

The bottom 20 defines a pair of spaced rails 40 which receive a pair of plates 42 to define an undercut slot to receive a support arm for the magazine. In accordance with the present invention, a mating support arm 44 (shown in fragmentary cross-sectional view in Figure 4) is rockably secured to the motion picture projector P, Figures 1 and 2. The arm 44 is pinned to a bracket 46 which is secured directly to the projector. This bracket defines a pair of spaced tables 46a and 46b against which the arm 46 bottoms to hold the magazine either in the operative position of Figure 1 where the surface 46b holds the arm or the retracted position where surface 46a sustains the arm.

It will be observed that the magazine, when supported on arm 44, does not interfere with normal operation of the projector P with a conventional film reel. This is shown clearly in Figure 2 where the magazine is nearly in the retracted position and the film reel R of the ordinary type is mounted on the projector. This feature is made possible by the combined use of the rockable arm 44 and a magazine capable of taking up film through a slot oriented transversely to the plane of the magazine and releasing film from a slot oriented parallel to the plane of the magazine.

The structure of Figures 1 and 2 is particularly suitable for use as a means of quickly converting the projector from operation on conventional film reels to operation with the magazine of the present invention. When swung to the position of Figure 2, the reel 34 does not interfere with projector operation with conventional film reels. However, if it is desired to display film from the magazine, all that is required is a simple rocking of the magazine to the position of the solid lines and threading the film through the gate and lens mechanism of the projector, indicated generally at 50.

The tightening action of withdrawing film from the inner periphery of the coil 24, together with the frictional drag of the coil on the surface 20a of the back plate 20 and other surfaces engaged by the moving film demands a substantial force on the film to withdraw it from the coil 24. In the case of relatively large coils this force may exceed the capacity of the motion picture projector or other device using the film or may exceed the capacity of the film, especially the indexing openings. In the structure shown in Figure 6 this problem is overcome by the use of auxiliary drive means operative to rotate the roller 26 in response to the tension on portion 24a of the film.

As shown in Figure 6, the back plate 20 is apertured at 20b. A drive motor 52 is mounted on the back plate 20 in slanted position with its shaft 54 extending through the aperture 20b. A conical tip 56 of rubber or like high friction material is positioned on the end of the shaft 54 and fits snugly against the face of the flange 26b to define a drive connection between the motor 52 and the roller 26.

The motor 52 is supported from the back plate 20 by the angle bracket 58 which is secured to the plate 20 and the motor 52 by welding or other suitable method.

The motor 52 is energized from a suitable source of electric potential, such as generator 60, through the switch 62. This switch is of the type, well known in the art, that establishes an electric circuit when the button 62a is depressed.

The arm 64 is rockably supported from the edge 22 of the magazine by the bracket 23a which supports the pin 66 carrying the arm 64. The arm 64 is positioned in registry with the button 62a so that rotation of the arm in the clockwise direction as shown in Figure 6 depresses the button and closes the switch.

The post 23a has a protuberance 23b that defines a seat against which the arm 64 bottoms. The arm is biased in the seat-engaging direction by the coil spring 68 which at end 68a underlies the arm and at the end 68b engages the post 23a.

At the end opposite button 62a, the arm 64 carries the roller 70. This roller has end flanges 70a to guide the film and is rotatably supported from the arm 64 by the pin 72.

As shown in Figure 6, the portion 24a of the film passes over the roller 70 to the gate mechanism of the motion picture projector, this mechanism being shown diagrammatically at 50a, Figure 6.

In operation, the mechanism of Figure 6 operates with the motor 52 in a normally unenergized condition. However, when the tension on the portion 24a of the film associated with the take-up action of the gate mechanism 50a (shown diagrammatically in Figure 6) exceeds a predetermined value, the roller 70 rocks the arm 64 in direction to engage and depress button 62a. This establishes the energizing circuit for the motor 52 and causes rotation of the motor in direction to drive roller 26 in the film unwinding direction, thereby supplementing the action of the film itself and relieving the film of the burden associated with rotating the roller 26 and the film coil 24.

As the motor 52 operates, the tension on the portion 24a of the film is gradually reduced until it falls below the value required to maintain the switch 62 in the closed condition. This value of tension is somewhat less than the value required to depress the button 62a because of frictional resistance to motion, together with the lost motion inherent in the mechanical system.

From the foregoing description it will be evident that the arm 64 operates to open and close switch 62 to maintain the tension on the portion 24a of the film between predetermined tension limits. This precludes overload of the film using mechanism and, moreover, the film coil is maintained in a desirable compact and taut condition.

The structure of the present invention provides a single reel mechanism capable of effectively retaining a film and which may be used to store the same. Moreover, it is particularly suitable for use in displaying a motion picture repeatedly. In this respect it is useful in dubbing in voice or music on a visual program or in showing continuous repetitive advertising displays. However, it is also useful in handling film or other media for magnetic or mechanical sound recording and reproducing and other similar applications.

While I have shown and described particular embodiments of the present invention, it will, of course, be understood that I do not wish to be limited thereto and intend by the appended claim to cover all variations and alternative embodiments coming within the true spirit and scope of my invention.

What I claim as new and desire to secure by Letters Patent of the United States is:

In a device to receive an endless film wound in a coil, the improvement which comprises a roller disposed within said coil with its axis parallel to the axis of said coil, said roller having a pair of spaced flanges defining between them a film-receiving slot, one of said flanges being substantially larger in diameter than the other and the opposed faces of said flanges being shaped to define a slot progressively narrower toward the axis of the roller and merging near the roller axis at an acute angle, a first guide member mounted adjacent the roller defining a surface substantially parallel to the axis of said coil and adapted to bear against the inner periphery thereof at a point substantially opposite said roller, and a second guide member disposed near said first guide member and defining a surface substantially perpendicular to the axis of said coil, operative to guide said film over and across the convolutions of said coil.

WILLIAM C. EDDY.

References Cited in the file of this patent

UNITED STATES PATENTS

| Number | Name | Date |
|---|---|---|
| 1,254,272 | Penon | Jan. 22, 1918 |
| 1,829,095 | King et al. | Oct. 27, 1931 |
| 1,946,604 | Wittel | Feb. 13, 1934 |
| 2,273,274 | Krouse | Feb. 17, 1942 |
| 2,311,383 | Hardenberg | Feb. 16, 1943 |
| 2,319,092 | Spence | May 11, 1943 |
| 2,327,108 | Heyer | Aug. 17, 1943 |
| 2,398,639 | Heyer | Apr. 16, 1946 |
| 2,464,965 | Chemel | Mar. 22, 1949 |
| 2,568,339 | Jacobson | Sept. 18, 1951 |

FOREIGN PATENTS

| Number | Country | Date |
|---|---|---|
| 23,138 | Australia | Oct. 21, 1929 |
| 290,839 | Great Britain | May 24, 1928 |
| 547,358 | France | Sept. 20, 1922 |